United States Patent [19]

Bowling et al.

[11] 3,762,032
[45] Oct. 2, 1973

[54] BONDING
[75] Inventors: Charles E. Bowling, Speedway; George B. Meginnis, Indianapolis, both of Ind.
[73] Assignee: General Motors Corporation, Detroit, Mich.
[22] Filed: Aug. 19, 1971
[21] Appl. No.: 173,112

[52] U.S. Cl............ 29/493, 29/497.5, 29/473.5, 29/516, 29/523, 219/160, 219/161, 269/52, 269/287
[51] Int. Cl.................... B23k 5/22, B23k 31/02
[58] Field of Search.............. 29/493, 497.5, 473.5, 29/523, 516, 517; 269/52, 287; 219/160, 161

[56] References Cited
UNITED STATES PATENTS

| | | | |
|---|---|---|---|
| 1,078,906 | 11/1913 | Eldred | 29/473.5 |
| 1,508,342 | 9/1924 | Lee | 29/493 UX |
| 2,424,878 | 7/1947 | Crook | 29/473.5 X |
| 2,882,587 | 4/1959 | McCowan Unger et al. | 29/497.5 X |
| 2,967,139 | 1/1961 | Bortoszak | 29/473.5 |
| 3,025,596 | 3/1962 | Ward et al. | 29/479 X |
| 3,184,362 | 5/1965 | Litsky et al. | 29/493 X |
| 3,426,420 | 2/1969 | Grant et al. | 29/473.5 X |
| 3,550,254 | 12/1970 | Greenspan et al. | 29/493 |
| 3,571,908 | 3/1971 | Pilia | 29/493 |
| 3,691,614 | 9/1972 | Bernard et al. | 29/516 X |
| 3,481,024 | 12/1969 | Bunn | 29/473.5 |

*Primary Examiner*—J. Spencer Overholser
*Assistant Examiner*—Ronald J. Shore
*Attorney*—Paul Fitzpatrick et al.

[57] ABSTRACT

Controlled pressure is put onto workpieces which are being bonded by diffusion bonding, or other processes involving heating the workpiece, by a fixture which develops the pressure by differential thermal expansion between inner and outer members of the fixture.

9 Claims, 5 Drawing Figures

PATENTED OCT 2 1973

INVENTORS
Charles E. Bowling, &
BY George B. Meginnis

Paul Fitzpatrick
ATTORNEY

INVENTORS
Charles E. Bowling, &
BY George B. Meginnis
Paul Fitzpatrick
ATTORNEY

BONDING

DESCRIPTION

Our invention relates to bonding processes and particularly to improved methods and apparatus for exerting a controlled pressure upon parts which are being bonded together by heat and pressure. Our invention has been conceived for use in, and is particularly applicable and desirable in, diffusion bonding procedures in which a workpiece which may consist of two or more parts has the parts firmly joined together by a metallurgical bond between the parts at their interfaces. The diffusion bonding involves preparing the surfaces of the material and heating the workpiece in a vacuum or inert atmosphere, with the parts pressed together, to a temperature such that union of the parts occurs by solid state diffusion without the presence of a liquid phase.

The exertion of sufficient pressure is necessary for successful diffusion bonding; but, on the other hand, with some workpieces, particularly those of a porous nature, too great a pressure will damage the structures to be bonded.

Examples of the sort of structure to bonding of which the invention is particularly suited are porous sealing rings described in Allen U.S. Pat. No. 3,411,794, Nov. 19, 1968, and Meginnis U.S. Pat. No. 3,529,905, Sept. 22, 1970 and porous blade structures illustrated in Helms U.S. Pat. No. 3,554,663, Jan. 12, 1971, and Bratkovich and Meginnis U.S. Pat. No. 3,584,972, June 15, 1971. However, our invention is not restricted to bonding of such porous structures.

It may also be pointed out that brazing may involve somewhat similar procedures, from the standpoint of handling the work. In brazing the bond between the two parts is provided by fusing of another metal of lower melting point disposed between the parts to be bonded as they are held together.

By way of introduction to our invention, it may be stated that it involves the use of a fixture or clamping device having parts of different coefficients of thermal expansion so constructed that, after the workpiece is mounted in the fixture and as the workpiece and fixture are heated as part of the bonding process, the differential expansion of the parts of the fixture exerts the desired degree of pressure or squeeze on the parts to be bonded. This principle may be employed in structures of various types, as is illustrated herein by three different arrangements therefor.

The principal objects of our invention are to facilitate bonding processes, to control the force or displacement of clamping devices to be used in bonding processes, to provide fixtures of a type particularly simple and particularly suited to the exertion of a desired clamping force during bonding operations, and to provide thermally actuated clamping or holding devices.

The nature of our invention and its advantages will be clear to those skilled in the art from the succeeding detailed description of preferred embodiments of the invention and the accompanying drawings thereof.

Figure 1:
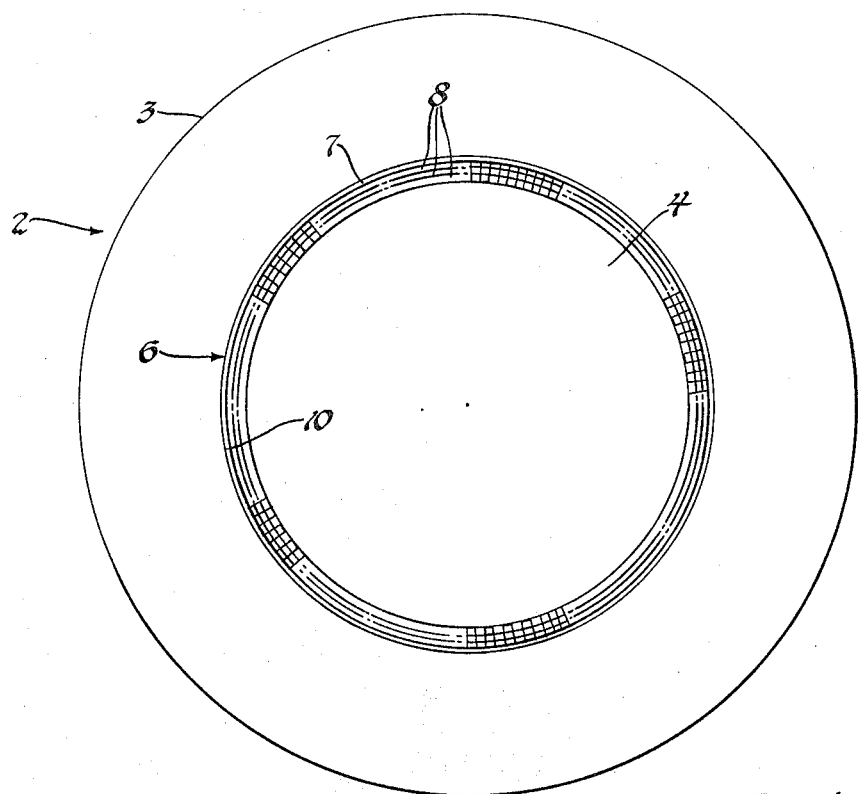
FIG. 1 is a view of a fixture for bonding a laminated ring.

Referring first to FIG. 1 which is a view of a cylindrical fixture looking along the axis thereof, the fixture 2 comprises a ring 3 and a plug 4 which may have plane parallel faces and preferably have circular cylindrical peripheries. The workpiece 6 to be bonded in this case is a cylindrical laminated structure which may, for example, be a laminated cylindrical seal ring such as those shown in the Allen and Meginnis patents referred to above. Such a ring may include an outer imperforate layer 7 and any suitable number of perforate inner layers 8. The layers, after having been properly cleaned and, if desired, nickel plated to improve the bonding process, are mounted one within the other in contact. The workpiece is then put inside the internal opening 10 of the ring and the plug is mounted inside the workpiece 6. The amount of clearance must be sufficient so that the parts can be readily fitted together and is determined by the requirements of any particular bonding operation. Depending upon the particular operation, there will be some temperature at which the parts are maintained for a predetermined time, or to which they are brought, to effect the bonding. The ring and plug must have the desired degree of differential expansion to close the gap as desired and exert the desired force to compress the layers of the workpiece together properly.

The material of the plug and ring therefore must be of different thermal expansion and must be of materials which are tolerant of the heat involved in the processing of the work. In the particular case illustrated in FIG. 1, the plug may be made of the alloy available comercially under the trademark Hastelloy X which has a coefficient of thermal expansion of about $9.5 \times 10^{-6}/°$ F. The ring may be of type 410 stainless steel of which the coefficient of thermal expansion is about $6.0 \times 10^{-6}/°$ F. This quite considerable difference in thermal expansion can give rise to a quite substantial relative growth of the plug with respect to the ring when the parts are heated to temperatures which may be of the order of 2,000° in some processes.

Whatever the process, the dimensions of the parts to arrive at the desired impingement of the workpiece may be arrived at by calculation and, if necessary, corrected by experiment.

Alternatively to inserting the plug within the workpiece, a workpiece may be wrapped around the plug prior to its insertion into the ring. In this case it may be desirable to have the thermal expansion of the plug the same as that of the workpiece. Some laminated structures may be made by winding a strip, using the plug as a mandrel.

It is also possible to arrange an annular laminated workpiece inside a ring and provide the pressure with a plug which has a greater coefficient of thermal expansion. This appears less feasible, however.

Any bonding of the workpiece to the tooling or parts of the tooling together may be prevented by using a suitable stopoff material.

Figure 2:
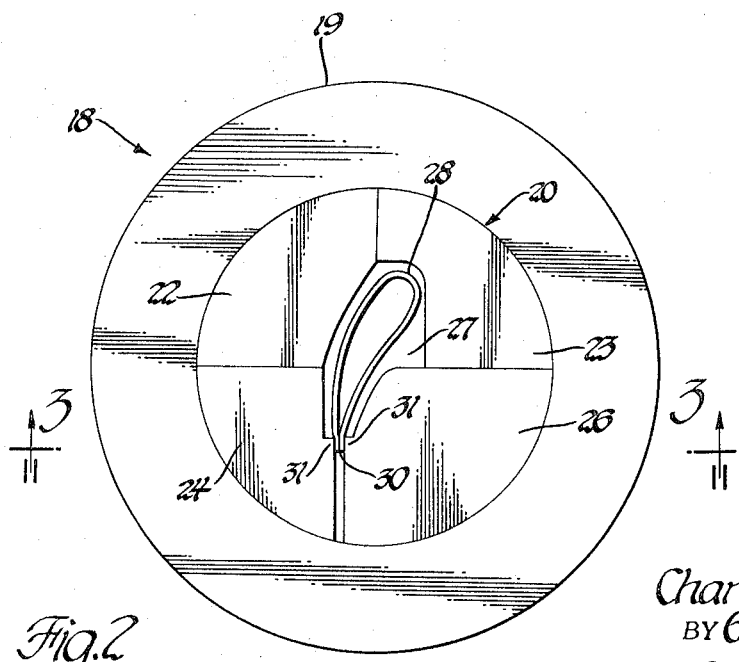
FIG. 2 is a similar view of a fixture for bonding the trailing edge of a hollow sheet metal turbine vane or blade.
Figure 3:
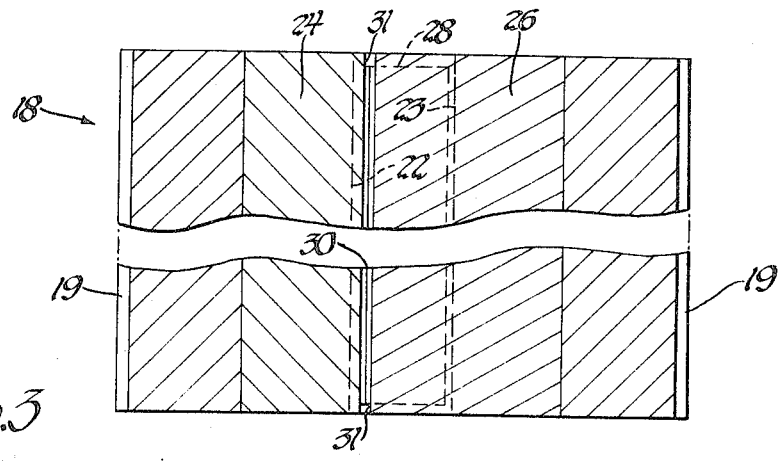
FIG. 3 is a sectional view of the same taken on the plane indicated by the line 3—3 in FIG. 2.

FIGS. 2 and 3 illustrate a fixture of different structure adapted to clamp the trailing edge of a hollow blade, which may be of porous material or laminated, or may not. The fixture 18 of these figures includes a ring 19 and a plug 20. The plug 20 in this case is made of four blocks 22, 23, 24, and 26 which, as shown, occupy each about one-quarter of the interior of the ring 19. The portions of these blocks adjacent the axis of the fixture are cut away to leave a void or space 27 within which the workpiece 28 is disposed. This workpiece is a sheet metal airfoil made up of a formed sheet, the edges of which are abutted and bonded at the trailing edge 30. The workpiece shown might be a turbine vane or blade or other analogous structure. The blocks 24 and 26 provide jaws 31 between which the trailing edge portion 30 is fitted.

In this case, as before, the ring is of a lower coefficient of thermal expansion than the plug so, as the workpiece and fixture are brought up to the bonding temperature, the pressure is exerted as desired on the abutting trailing edge portions of the airfoil.

While the plug 20 as shown is made up of four blocks 22, 23, 24, and 26, it will be apparent that other configurations might be suitable to this or other operations. So far as taking care of the trailing edge is concerned, the several blocks shown in FIG. 2 might be one integral part in which the gap between the jaws 31 is defined by a slot closed by the constriction of the ring 19 around the plug.

The selection of materials of appropriate coefficients of expansion is a matter of choice. Graphite, which has a low coefficient of thermal expansion, might be employed for the ring with a metal plug.

Figure 4:
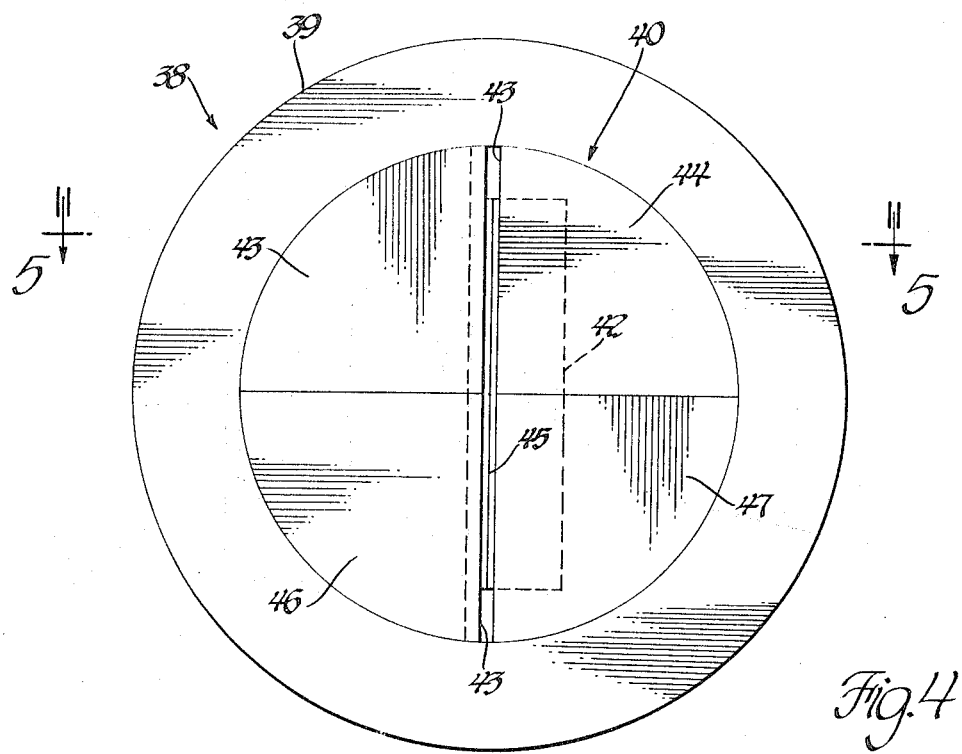
FIG. 4 is a view of a different arrangement for bonding a vane or blade trailing edge.
Figure 5:
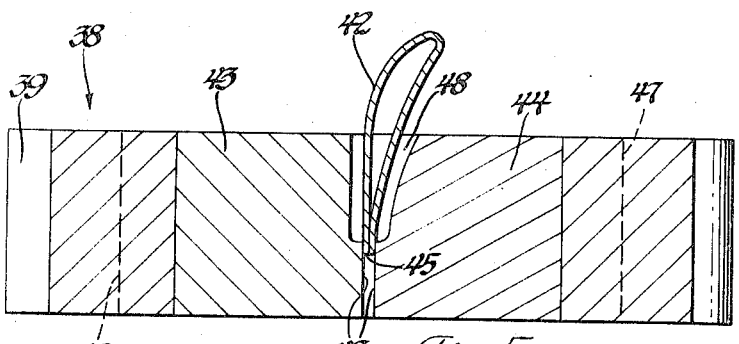
FIG. 5 is a sectional view of the same taken on the plane indicated by the line 5—5 in FIG. 4.

FIGS. 4 and 5 illustrate a third form of fixture 38 including a ring 39 and a sectionalized plug 40. As illustrated, this is also used to bond together the trailing edges of the walls of the sheet metal vane or blade 42. In this case, however, the trailing edge is disposed approximately along a diameter of the fixture. The plug in this case is made up of four blocks 43, 44, 46, and 47. The facing edges of the blocks 43 and 44 and of the blocks 46 and 47, respectively, define jaws 43 between which the trailing edge 45 of the vane is held. The upper part, as illustrated in FIG. 5, provides a clearance space 48 around the remainder of the vane. Here again the principle of operation is the same.

The foregoing examples illustrate that there are many ways in which the interior of a ring may be filled with an integral or sectionalized plug to provide a gap within which a workpiece is held and compressed as the heating of the workpiece and fixture causes the ring to contract against the plug.

Obviously, the ring and plug are not necessarily of circular cross-section.

The simplicity and suitability of these structures for the intended purpose should be apparent.

The detailed description of preferred embodiments of the invention for the purpose of explaining the principles thereof is not to be considered as limiting or restricting the invention, since many modifications may be made by the exercise of skill in the art.

We claim:

1. A fixture for holding and exerting force on a workpiece to be bonded in response to heating of the fixture, the fixture comprising, in combination, a ring and a plug fitted within the ring, the ring having a lower coefficient of thermal expansion than the plug so that the ring contracts relatively to the plug upon heating, the fixture being configured to receive a workpiece so as to exert a clamping force on the workpiece in response to such relative contraction.

2. A fixture for exerting radial compressive force on an annular workpiece to be bonded in response to heating of the fixture comprising, in combination, a plug configured to fit the interior of the workpiece and a ring configured to fit the exterior of the workpiece, the plug having a higher coefficient of thermal expansion than the ring so that the workpiece is radially compressed by differential expansion of the plug and ring upon heating the fixture.

3. A fixture for exerting radial compressive force on an annular workpiece to be bonded in response to heating of the fixture comprising, in combination, a plug component configured to fit the interior of the workpiece and a ring component configured to fit the exterior of the workpiece, one of the said components having a coefficient of thermal expansion substantially equal to that of the workpiece and the plug component having a higher coefficient of thermal expansion than the ring component so that the workpiece is radially compressed by differential expansion of the components upon heating the fixture.

4. A fixture for holding and exerting force on a workpiece to be bonded in response to heating of the fixture, the fixture comprising, in combination, a ring and a plug fitted within the ring, the ring having a lower coefficient of thermal expansion than the plug so that the ring contracts relatively to the plug upon heating, the plug defining jaws configured to receive the workpiece and contract to clamp the workpiece between the jaws in response to the relative contraction of the ring and the plug.

5. A fixture for holding and exerting force on a workpiece to be bonded in response to heating of the fixture, the fixture comprising, in combination, a ring and a plug fitted within the ring, the ring having a lower coefficient of thermal expansion than the plug so that the ring contracts relatively to the plug upon heating, the plug having walls defining a slot configured to receive the workpiece and contract to clamp the workpiece between the walls of the slot in response to the relative contraction of the ring and the plug.

6. A fixture for holding and exerting force on a workpiece to be bonded in response to heating of the fixture, the fixture comprising, in combination, a ring and a plug fitted within the ring, the ring having a lower coefficient of thermal expansion than the plug so that the ring contracts relatively to the plug upon heating, the plug comprising at least two separate blocks configured to receive the workpiece between the blocks and to impinge the workpiece in response to the relative contraction of the ring and the plug.

7. A method of exerting pressure on a workpiece having at least two abutting parts to be bonded together by the application of heat and pressure to the parts comprising mounting the workpiece at a relatively low temperature in a fixture and then heating the workpiece and fixture, characterized by the utilization of differential thermal expansion of parts of the fixture during the heating to apply the pressure to the workpiece.

8. A method of exerting pressure on an annular laminated workpiece having at least two abutting layers to be bonded together by the application of heat and pressure to the parts, comprising mounting the workpiece at a relatively low temperature on a mandrel having substantially the same coefficient of thermal expansion as the workpiece, inserting the workpiece and mandrel into a ring having a lower coefficient of thermal expansion than the mandrel, and then heating the workpiece, mandrel, and ring to employ differential thermal expansion of the mandrel and ring to apply the pressure to the workpiece.

9. A method as recited in claim 8 in which the workpiece is mounted on the mandrel by winding a strip onto the mandrel.

* * * * *